(12) United States Patent
Sarai

(10) Patent No.: US 10,815,001 B2
(45) Date of Patent: Oct. 27, 2020

(54) COCKPIT INTERNAL ANTI SABOTAGE SYSTEM (CIASS)

(71) Applicant: Amardeep Singh Sarai, Bangalore (IN)

(72) Inventor: Amardeep Singh Sarai, Bangalore (IN)

( * ) Notice: Subject to any disclaimer, the term of this patent is extended or adjusted under 35 U.S.C. 154(b) by 603 days.

(21) Appl. No.: 15/547,808

(22) PCT Filed: Mar. 20, 2015

(86) PCT No.: PCT/IN2015/050025
§ 371 (c)(1),
(2) Date: Aug. 1, 2017

(87) PCT Pub. No.: WO2016/125180
PCT Pub. Date: Aug. 11, 2016

(65) Prior Publication Data
US 2018/0022471 A1    Jan. 25, 2018

(30) Foreign Application Priority Data

Feb. 4, 2015  (IN) .............................. 562/CHE/2015

(51) Int. Cl.
*B64D 45/00* (2006.01)
*G07C 9/00* (2020.01)
(Continued)

(52) U.S. Cl.
CPC ............ *B64D 45/0015* (2013.01); *B64C 1/14* (2013.01); *B64C 1/1469* (2013.01); *B64D 45/00* (2013.01);
(Continued)

(58) Field of Classification Search
CPC ....... B64C 1/1461; B64C 1/1469; B64C 1/14; B64D 45/0015; B64D 45/00; G07C 9/00;
(Continued)

(56) References Cited

U.S. PATENT DOCUMENTS 6,659,401 B1 * 12/2003 Semprini .............. B64C 1/1469
244/118.5
6,769,646 B1 *  8/2004 Komiyama ........... B64C 1/1469
244/118.5
(Continued)

FOREIGN PATENT DOCUMENTS

EP     0 121 517 B1   3/1988
WO    2005090718 A1   9/2005

OTHER PUBLICATIONS

International Search Report (Form PCT/ISA/210) dated Feb. 3, 2016, by the Indian Patent Office in corresponding International Application No. PCT/IN2015/050025. (2 pages).

*Primary Examiner* — Richard R. Green
*Assistant Examiner* — Steven J Shur
(74) *Attorney, Agent, or Firm* — Buchanan Ingersoll & Rooney PC

(57) ABSTRACT

A cockpit internal anti-sabotage system (CIASS) without compromising the cockpit security and the present anti-hijacking procedure and protocol, wherein a single cockpit crew alone in the cockpit cannot deny bonafide entry of other cockpit crew or cabin crew in an attempt to commit suicide or sabotage the aircraft, the system comprises a manual door lock system and an automated door lock system wherein both the systems comprising a mechanical system or a non-mechanical system or combination of both.

20 Claims, 8 Drawing Sheets

(51) Int. Cl.
*G07C 9/37* (2020.01)
*B64C 1/14* (2006.01)
*E05B 17/00* (2006.01)
*E05B 47/00* (2006.01)
*E05B 53/00* (2006.01)
*E05B 15/02* (2006.01)

(52) U.S. Cl.
CPC ............ *E05B 15/029* (2013.01); *E05B 17/00* (2013.01); *E05B 17/005* (2013.01); *E05B 47/00* (2013.01); *E05B 47/0001* (2013.01); *E05B 53/00* (2013.01); *E05B 53/003* (2013.01); *G07C 9/00* (2013.01); *G07C 9/00896* (2013.01); *G07C 9/37* (2020.01)

(58) Field of Classification Search
CPC . G07C 9/37; E05B 17/00; E05B 47/00; E05B 53/00
USPC .............................. 244/121, 129.5, 221, 224
See application file for complete search history.

(56) References Cited

U.S. PATENT DOCUMENTS

| | | | |
|---|---|---|---|
| 6,793,179 B2* | 9/2004 | Daniels | B64C 1/1469 244/118.5 |
| 6,830,217 B2* | 12/2004 | Movsesian | B64C 1/1469 244/118.5 |
| 7,193,520 B2* | 3/2007 | Shear | B64C 1/1469 340/574 |
| 8,505,850 B2 | 8/2013 | Pujol et al. | |
| 9,688,379 B2* | 6/2017 | Koch | B64C 1/1469 |
| 2003/0173458 A1 | 9/2003 | Bandy et al. | |
| 2005/0116098 A1* | 6/2005 | Martens | B64C 1/1469 244/118.5 |

\* cited by examiner

COCKPIT INTERNAL ANTI SABOTAGE SYSTEM (CIASS)

FIELD OF INVENTION

The invention relates to cockpit internal anti-sabotage system (CIASS). More particularly, the invention relates to cockpit internal anti-sabotage system (CIASS), without compromising the cockpit security and the present anti-hijacking procedure and protocol, wherein a single cockpit crew alone in the cockpit cannot deny bonafide entry of other cockpit crew or cabin crew in an attempt to commit suicide or sabotage the aircraft.

BACKGROUND OF THE INVENTION

Air travel is not only the fastest but also the safest mode of travel in view of the number of deaths per year due to accidents worldwide. Since last many decades the primary focus of the airlines had been the safety of the passengers and the aircrafts.

However, history of the airlines safety as regards hijacking can be divided in two phases. One being the pre 9/11 phase and other being the post 9/11 period. After the incidence of 9/11, many successful efforts have been made to prevent aircraft hijacking by preventing the hijacker's entry into the cockpit and taking over the control of the aircraft.

Typically, the security system in the cockpit door of an aircraft prevents many fatal risk associated with unauthorized entry in to the cockpit. The cockpit door separates the cockpit from the passenger cabin. This cockpit door is secured in order to protect the cockpit crew from any attack by passengers or hijackers. In order to improve the cockpit security the cockpit door is made bullet proof and locked with such a locking system that it can be opened only with the permission of the cockpit crew thereby preventing unauthorized entry of passengers or hijackers into the cockpit.

US20030173458 describes a security cockpit door locking system. This system provides a multi position rotary/toggle spring loaded switch having three switch positions: an "AUTO" position, an "UNLOCK" position and a "DENY" position. An individual in the cabin area makes a request to gain entry to the cockpit by entering a predetermined access code into the keypad in the cabin area of the cockpit door. Requests produce sound signal as well as visual display inside the cockpit indicating the pilots that a request has been made to unlock the door from the cabin crew, where the cockpit crew (pilots) can choose DENY/CLOSE or UNLOCK/OPEN position through the switch. The switch is always in the AUTO POSITION. If a decision is made to allow entry the switch is moved to the unlock/open, if due to any threat perception the crew decide to deny entry, the switch is moved to deny/close position. After the deny command is selected by the crew, entry request via keypad is automatically blocked for a predetermined time (5 to 30 min), If however there is no response from the cockpit (due to incapacitation or any other reason) after entry request is made via the keypad, the door will automatically open after a predetermined time lapse of 30 seconds as the switch is always in the auto mode. The keypad described above does not have the capability under any circumstances to unlock the door lock of the cockpit door. The lock is controlled strictly by signals received from the switch provided in the cockpit. Accordingly, no amount of tampering with the keypad, or even the destruction of the keypad, can result in unlocking of the cockpit door once it is locked. Unlocking can be accomplished only via the multi position switch inside the cockpit or the predetermined programmed time lapse.

U.S. Pat. No. 8,505,850 Describes a locking and unlocking system of cockpit door comprising means for automatic unlocking of the cockpit door in case the aircraft crashes. The system allows the automatic opening of the cockpit door in case of a crash, while at the same time maintaining the integrity and the functionality of the cockpit door during flight phases.

U.S. Pat. No. 6,830,217 Describes to a cockpit door locking system having an electromechanical locking assembly capable of maintaining a door locking mechanism in its locked position in the event of a power shortage. The locking assembly is situated in or on the cockpit door and includes a locking component, such as a latch or a dead bolt, that remains locked whether or not the system remains energized. The electronic control panel further controls a user input device adapted to receive an access code from a cabin crew member. The electronic control panel thereafter informs the cockpit crew that a cabin crew member has requested access, and the cockpit crew can choose to grant or deny access. The cockpit door locking system also includes a mechanical key lock assembly that requires engagement by a physical key which can: (1) lock or unlock the locking assembly in the event of a power shortage; and (2) act as a substitute for the security code when power is available for system operation.

It is apparent from the above and many other prior arts that lot of efforts have been made for improving cockpit security and preventing unauthorized entry into the cockpit. These efforts have also been successful which is evident from the fact that any major incidence of aircraft hijacking and forceful entry into the cockpit has not been reported in recent past.

However, these foolproof security systems of the cockpit door have led to a different type of threat to the safety of the passengers and aircraft wherein the cockpit crew can deny even a bona fide entry into the cockpit. This puts the safety of the passengers and aircraft at a fatal risk in case of internal cockpit sabotage by any of the cockpit crew. The security systems meant for denying any unauthorized/forced entry into the cockpit can also be used to deny any bonafide entry into the cockpit in the situation of internal sabotage by any cockpit crew.

Since the advent of commercial aviation, there have been many refinements in all the related fields and in the field of aviation safety the latest big invention was that of the reinforced cockpit door with controlled access and it has been a great success.

The integrated cockpit door lock and access system U.S. Pat. No. 6,830,217 used by Boeing, the cockpit door locking system used by airbus and similar systems adopted by various aircrafts are good systems to prevent any type of forced entry in the cockpit but what if there is internal sabotage at play? The same system will be used to refuse a bona fide entry.

There have been many instances of internal sabotage or suspected internal sabotage since before the advent of the reinforced door and access system and thereafter, leading to fatal crashes. In the past about fifteen months itself there have been three events, two confirmed and one suspected. In one of the confirmed event the first officer of Ethiopian flight 702 on 17 Feb. 2014, hijacked his aircraft after locking the captain out over Sudan and was forced to land at Geneva, in a bid to escape his country and seek asylum in Europe, luckily other than anxious moments during the flight, all 202 souls on board were safe after their ordeal.

The suspect incident of internal sabotage being, the MH 370, presumed crashed in the Indian ocean. The Mozambique TM470 that crashed on 29 Nov. 2013, is a confirmed case of MURDER-SUICIDE by the Captain of that flight killing all 33 souls on board.

With so many changes in our lifestyle, the fast paced life we are all now used to, the global nature of the job at hand, despite strict screening processes at the time of joining the airline and refresher trainings, it is at times difficult to judge when a perfectly healthy and happy employee may become depressive/suicidal. Moreover in all the above mentioned cases the protocol established by all the respective governing bodies, including the regulatory body for the countries and ICAO, regarding having one cabin crew inside the cockpit, so as to have a minimum of 2 people there at all times if/when one cockpit crew must leave the cockpit for a toilet break seems to have been not followed or deliberately breached by the person in the cockpit.

The other cases of suspect/confirmed internal sabotage are as follows

Silk air crash of 1997

Egypt air crash of 1999

More such cases and details of the above mentioned examples can be googled and seen on Wikipedia.

In the present door lock systems, there are two main means of denying entry to the cockpit By means of deny/close rotary/toggle switch.

By means of a latch (dead bolt)

Both system need to be maintained yet access still must be automatically granted in case of internal sabotage in the cockpit. My invention puts light on all the efficient and cost effective ways of achieving this goal, keeping retrofit as well as standard fit in all types of commercial aircrafts as per their cockpit layout as an option. Complying with all the aviation bodies and customising the product as per the needs of the manufacturers and the airlines.

In this invention no single person/crew can lock him/herself up, defying the 2crew Civil Aviation Requirement (CAR) in a bid to sabotage the aircraft.

The inventor, who has been in the field of aviation for over 17 years, out of which about 10 years being in the cabin side of the cockpit door in the capacity of a flight attendant, check crew, trainer and auditor and thereafter being cockpit crew and flying as a first officer and as captain, working with three different airlines in India and having flown four different types of aircraft in the process, realized that prior arts have provided foolproof security systems to secure the cockpit and to prevent the hijack/forceful entry into the cockpit but they have failed to provide any system to prevent cockpit internal sabotage without compromising the security of the cockpit as none of the prior arts describes a system to prevent cockpit internal sabotage.

Therefore, the inventor feels that there is an urgent need for a security system which is not only capable of providing/maintaining high cockpit security to secure it against any hijacking attempt/forceful entry into the cockpit but is also capable of allowing bonafide entry into the cockpit in case of suspected internal sabotage by the cockpit crew.

OBJECTS OF THE INVENTION

The primary object of the invention is to provide a cockpit internal anti sabotage system.

Another object of the invention is to provide an anti internal sabotage system which could allow bonafide entry into the cockpit in case of suspected internal sabotage without compromising the cockpit security and the present anti-hijacking procedure and protocol.

Another object of the invention is to provide an cockpit internal anti sabotage system wherein the security of the cockpit is maintained yet access of entry into cockpit is automatically granted in case of internal sabotage in the cockpit.

A further object of the invention is to provide a system wherein no single person/crew can lock him/herself in the cockpit defying the 2 crew Civil Aviation Requirement (CAR) in a bid to sabotage the aircraft.

Yet another object of the invention is to provide an efficient and cost effective system to prevent cockpit internal sabotage keeping retrofit as well as standard fit in all types of commercial aircrafts as per their cockpit layouts.

Yet another object of the invention is to provide a system to prevent cockpit internal sabotage capable of complying with all the aviation bodies and customising the product as per the needs of the manufacturers and the airlines.

SUMMARY OF THE INVENTION

Accordingly, the invention provides a cockpit internal anti-sabotage system (CIASS) which comprises a mechanical system and/or a non-mechanical or electronic system or combination of both.

The mechanical system comprises a locking device on cockpit door, a pair of manual control buttons/levers and a connecting means. Each manual control button/lever may be suitably located on side windows on each side of the cockpit or near the central pedestal or on the front pedestal. In one embodiment the connecting means is a strong string connecting both the manual control buttons/levers to the locking device on cockpit door. The string connects the control button/lever and locking device and can be encompassed in steel tube concealed in the aircraft's body frame.

The locking device is placed on cockpit door and door frame from inside the cockpit. The locking device comprises a latch placed on the cockpit door with a convex head and a concave housing on the door frame, wherein the concave housing has space to receive and fit the convex headed latch to lock the cockpit door in lock position. The concave housing comprises a metallic strip attached with the string on its upper end. The metallic strip is capable of up and down movement through frictionless pulley placed inside the concealed door frame. Alternatively, a spring loaded metallic strip may also be used at the bottom of the concave housing wherein the string is attached to metallic strip at lower end.

In its default position the metallic strip blocks the space inside concave housing. The metallic strip can be moved upwards/downwards by pressing/activating at least one manual control button/lever and pulling the string. When metallic strip upon being pulled up/down through string moves upwards or downwards, it vacates the concave housing making space in the concave housing to receive the latch and lock the door manually. If the control button/lever was released/de-activated before inserting the latch into concave housing, the metallic strip will drop down/move up back into the concave housing and will block the space of concave housing and therefore, it will become impossible to insert the latch inside the concave housing and manually lock the cockpit door.

In another embodiment, biometric/human touch sensor buttons are used as control buttons and radio frequency transponder is used in place of the string. The metallic strip is replaced by a simple remote lock through the sensor device attached to it, receives the activation message from control buttons and moves upwards/downwards from concave housing making space for inserting the latch and manual locking of cockpit door. In another embodiment, a normal lock placed within a casing along the door frame is used in place of metallic strip. In its default position, the lock is in locked position and therefore keeps the space of concave housing permanently blocked which is unlocked upon being activated through control buttons and transponder. When unlocked, it allows the latch to enter into concave housing and manually lock the cockpit door.

In another embodiment, the system comprises a non-mechanical/electronic system which operates through radio frequency transponder and aircraft's electronic communication system. Under this embodiment, the system comprises a pair of control buttons/switches, a rotary/toggle switch with locking device, radio frequency transponder and the cockpit door electronic locking device. Each control button/switch may be located at any suitable location inside the cockpit. The control buttons/switches are connected to the locking device on rotary/toggle switch through wired or wireless means. In its default position, the locking device on rotary/toggle switch is in locked position and does not allow the rotation/movement of rotary/toggle switch toward DENY/CLOSE position.

Both control buttons are connected to locking device of rotary/toggle switch either through wired means, mechanical or through wireless means such as radio frequency transponder.

In one embodiment, the control buttons are spring loaded and are connected to locking device of rotary/toggle switch through wired means. The control buttons can also be linked mechanically to the locking device attached to the rotary/toggle switch.

When activated simultaneously through both control buttons, the locking device on rotary/toggle switch is unlocked allowing its rotation/movement towards deny/close position. The locking device on rotary/toggle switch can be unlocked only when both control buttons are pressed/activated simultaneously. To keep the rotary/toggle switch in unlocked position, constant activation/pressing of both control buttons is necessary. Activation/pressing only one control button does not unlock the locking device on rotary/toggle switch and therotary/toggle switch remains in locked position being able to rotation/movement only from auto to open/allow position but not being able to move/rotate to close/deny position.

The wireless means connecting the control buttons to locking device on rotary/toggle switch comprise radio frequency transponder. Under this embodiment, both control buttons upon being simultaneously activated, send message to locking device of rotary/toggle switch through radio frequency transponder and unlock the locking device. This allows free movement of rotary/toggle switch from auto to deny/close position.

In a general embodiment, simultaneous activation/pressing of both control buttons and rotation/movement of rotary/toggle switch to deny/close position is required to deny the unlocking/opening of cockpit door. Upon receipt of consistent and simultaneous command from both the control buttons, received either by mechanical, wired or wireless means, locking device of rotary/toggle switch is unlocked. This allows the rotary/toggle switch to be rotated/moved to deny/close position and enabling the aircraft's electronic door system to keep the cockpit door in electronically locked position and disallowing anyone's entry into the cockpit.

As it is apparent hereinabove paragraphs, in any of the above embodiments, the system requires at least three hands to operate the system therefore, at any time at least two person are mandatory to be present in the cockpit to give the deny/close command electronically or to close the cockpit door manually. A person alone in the cockpit will never be able to give the deny/close command electronically or to close the cockpit door manually. In addition, in case of an attempted hostile cockpit takeover by an entity such as a hijacker, disturbed passenger or airline staff. The disclosed system will not allow the cockpit door to be locked from inside all by himself, enabling emergency access. Thus, the present disclosure helps in keeping the cockpit accessible to able bodied passengers, cabin crew and sky marshals (if present) by simple action of not activating the deny function by either or both the pilots under such situations. The simple one step deny toggle or rotary switch on the centre pedestal does not work independently anymore. The latch on the inside of the doorframe is also made redundant in absence of either single or dual control input spaced strategically as per the disclosed system.

In a further embodiment, the invention provides a system to prevent the aircraft hijack by unauthorized or forceful entry into the cockpit by deactivating the electronic pad outside cockpit door for an altitude of 0-2500 feet from the ground level. According to this embodiment, the electronic pad outside the cockpit door is deactivated at the time of takeoff the aircraft upto the aircraft reaching at an altitude of 2500 feet and upon reaching this height from land surface the electronic pad is reactivated. For automatic activation and deactivation of the electronic pad, the pad is connected with aircraft's height altimeter or radio altimeter and through an electronic circuit which works under automatic electronic system without any human intervention. Such circuit can easily be developed by a person skilled in the art.

Similarly, the electronic pad outside the cockpit door is deactivated at the time of landing the aircraft upon descending the aircraft height at an altitude of 2500 feet from the land surface and is reactivated upon touching the ground using the same electronic circuit.

DETAILED DESCRIPTION OF THE INVENTION

Detailed embodiments of the present invention are disclosed hereinafter in following paragraphs with reference to the drawings. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention provides a cockpit internal anti-sabotage system (CIASS), wherein a single cockpit crew alone in the cockpit cannot deny bonafide entry of other cockpit crew or cabin crew, in an attempt to commit suicide or sabotage the aircraft whereas, the system achieves its objectives without compromising the cockpit security and the present anti-hijacking procedures and protocol.

In an exemplary embodiment the system comprises a mechanical system and/or a non-mechanical or electronic system or combination of both.

In one embodiment, the system comprises a mechanical system comprising of a locking device (17) on cockpit door (3), a pair of manual control buttons/levers (12 and 13) and a connecting means (23).

Figure 1:
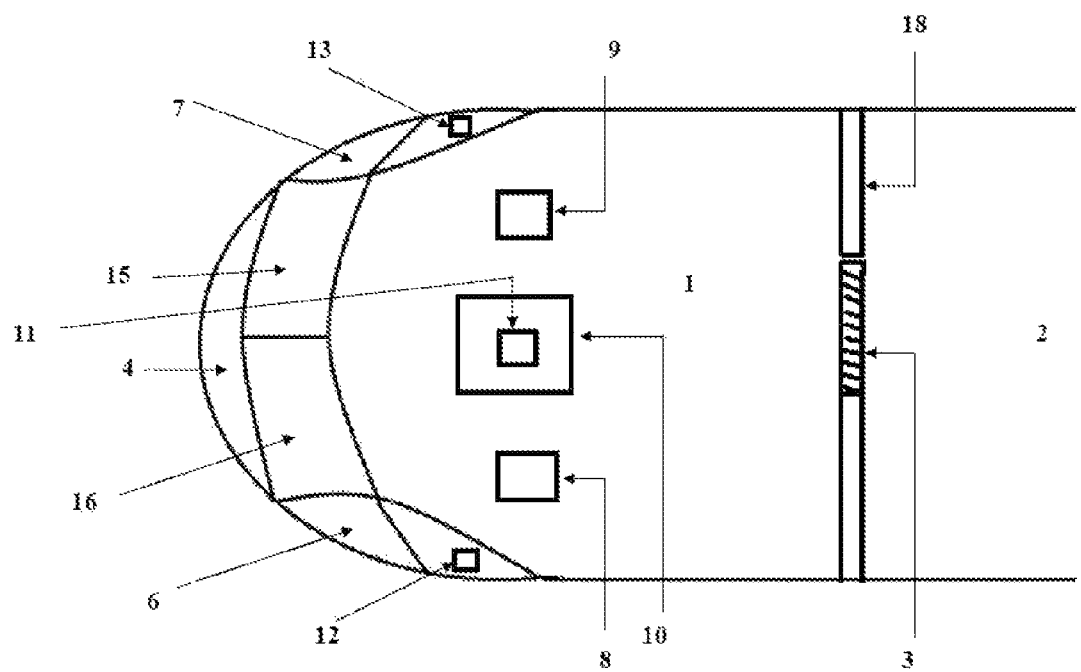
FIG. 1 illustrates a general overview of the cockpit and various components of the invention.

FIG. 1 in the accompanying drawings illustrates a general overview of the cockpit and various components of the invention. In general, an aircraft comprises a cockpit (1) and a passenger cabin (2). Cockpit door (3) separates the cockpit (1) from passenger cabin (2). Every cockpit has one front shield (4) and two side windows (6 and 7) on both sides of the cockpit nose. Each cockpit has at least two cockpit crew seats, wherein in general the captain seat (8) is on left side and first officer's seat (9) is on right side of the cockpit. In front centre position is central pedestal (10) of the cockpit which has rotary/toggle switch (11) located on the central pedestal. Manual control buttons/levers (12 and 13) may be suitably located on side windows (6 and 7) on each side of the cockpit or on/near central pedestal (10) or on front pedestals (15 and 16). However, each manual control button/lever should be suitably placed at a location in the cockpit (1) which is easily approachable and operable by each cockpit crew while operating the flight. Further, both buttons/levers (12 and 13) should be distant apart from each other at least for such a minimum distance that it is not possible for one person to simultaneously reach both buttons/levers (12 and 13) and to deny/close or lock using his/her both hands. In one preferred embodiment, the manual control buttons/levers (12 and 13) and fitted on or near side windows (6 and 7).

Figure 2:
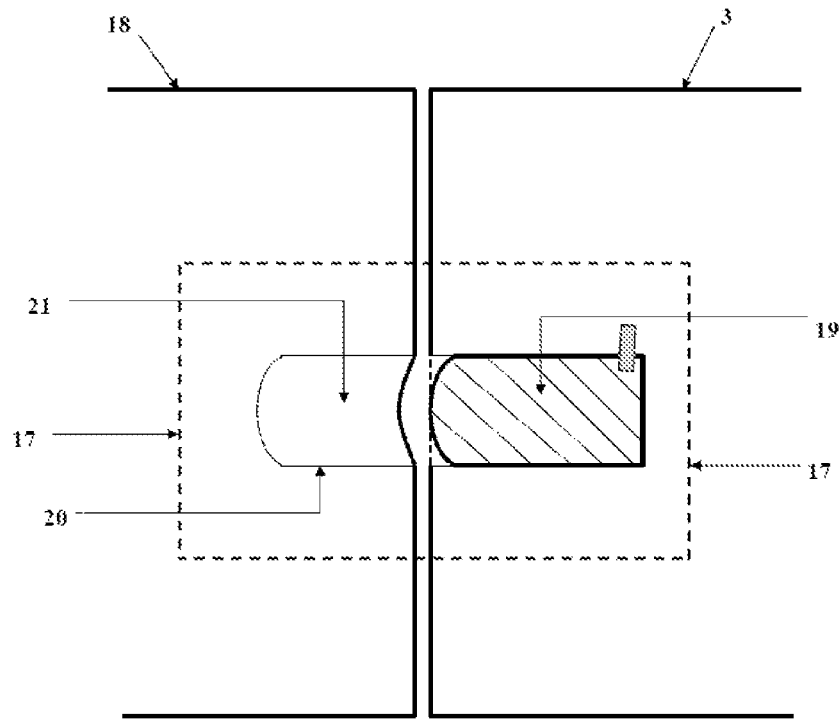
FIG. 2 illustrates the locking device on cockpit door and cockpit door frame.

FIG. 2, illustrates a locking device (17) on cockpit door (3) and cockpit door frame (18). The locking device (17) is placed on cockpit door (3) and door frame (18) from inside the cockpit (1). The locking device (17) comprises a door latch (19) placed on the cockpit door (3) perpendicular to the aircraft's surface, with a convex head and a corresponding concave housing (20) on the cockpit door frame (18), wherein the concave housing (20) has space (21) to receive and fit the convex headed door latch (19) to lock the cockpit door (3) in locked position (27).

Figure 3:
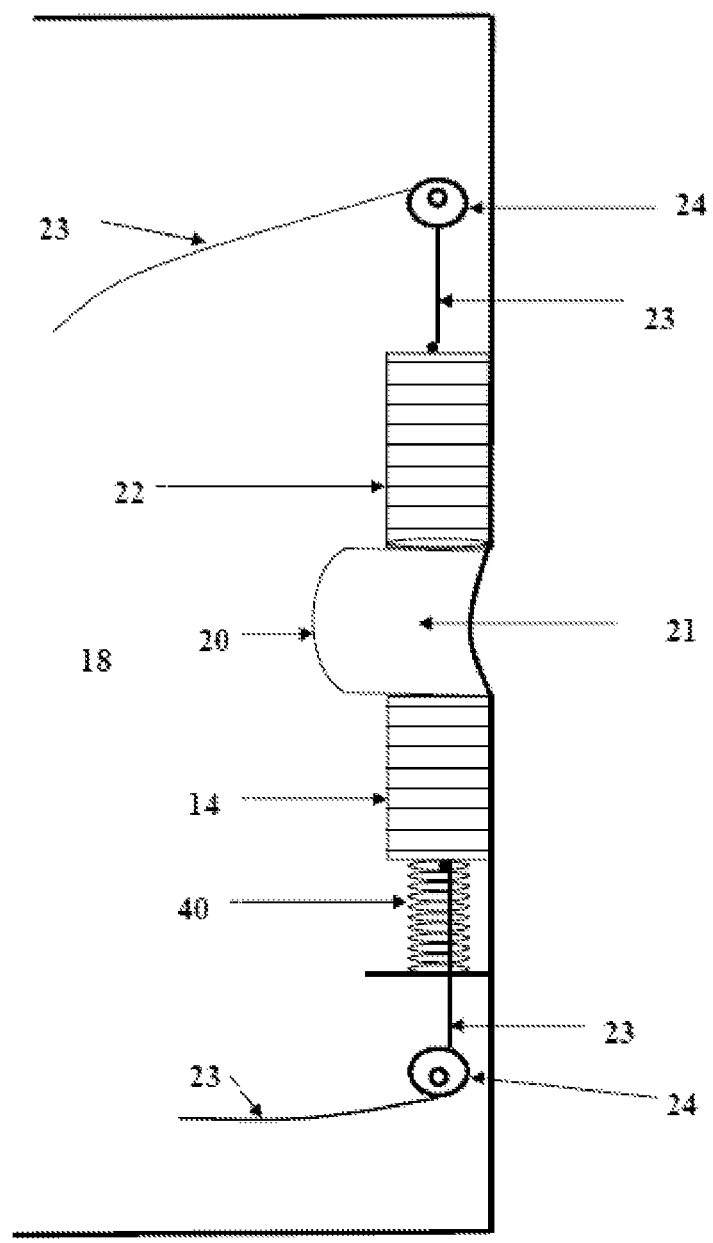
FIG. 3 is close view of manual locking device on cockpit door frame

As shown in FIG. 3, the concave housing (20) comprises a metallic strip (22) attached with a pair of strings (23, 26) on its upper end or alternatively a spring (40) loaded metallic strip (14) attached with a pair of strings (23, 26) on its lower end in one of the embodiments as described further in following paragraphs. The metallic strip (22 or 14) is capable of up and down movement through frictionless pulley (24) placed inside the concealed door frame (18).

The connecting means used in the system is a strong string (23, 26) connecting both the manual control buttons/levers (12, 13) to the metallic strip (22 or 14) in the locking device (17) on cockpit door (3). The string (23, 26) is a light weight string made of metal, alloys, cotton, silk or any other suitable material having high tensile strength and being light weight. The string connects the control button/lever (12, 13) and metallic strip (22 or 14) in the locking device (17) and can be encompassed in steel tube running along the aircraft internal frame.

Figure 4:
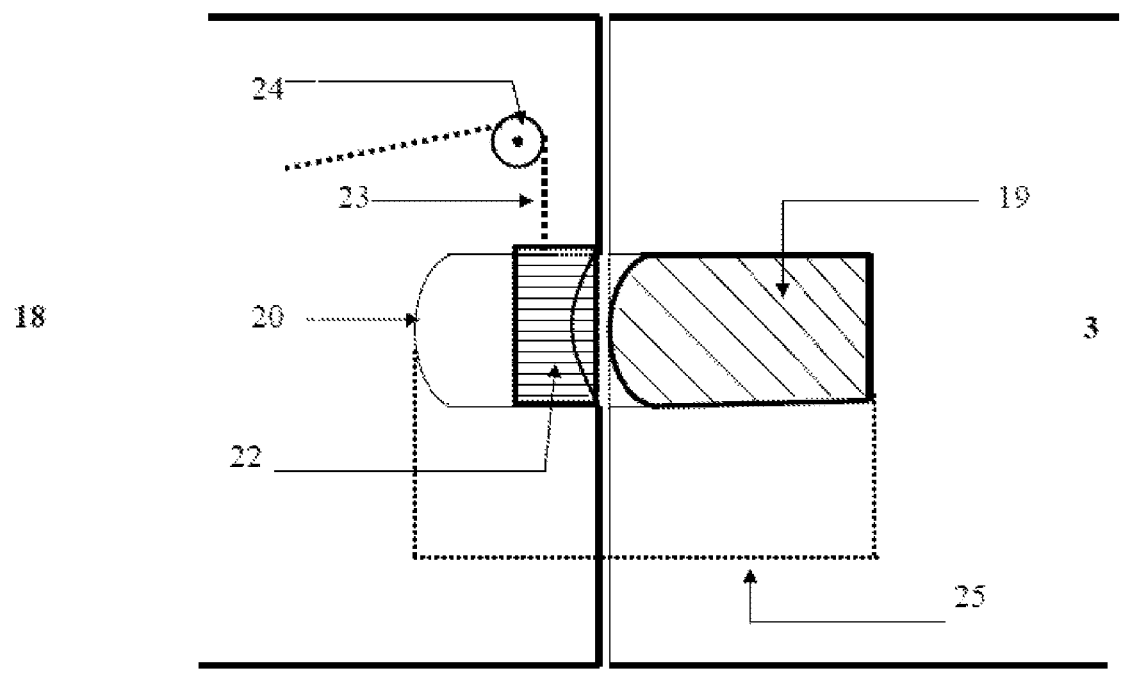
FIG. 4 illustrates locking device on cockpit door in manually unlocked position.

Referring to FIG. 4, in an exemplary embodiment, the metallic strip (22 or 14) is permanently housed in the concave housing (20) which is its default position. The default position of the control button/lever (12, 13) and metallic strip (22, 14) enables the metallic strip (22, 14) to permanently house the concave housing (20) and block the available space (21) therefore, there is no space (21) available in the concave housing (20) for the latch (19) to enter and lock the cockpit door (3). Therefore, in its default position the metallic strip (22, 14) blocks the space (21) inside concave housing (20) which could otherwise be available for the door latch (19) to enter into the concave housing (20) and lock the cockpit door (3) in manual door locking. The metallic strip (22, 14) therefore keeps the manual door latch (19) permanently in manually unlocked position (25).

The metallic strip (22, 14) can be moved upwards/downwards by pressing at least one manual control button/lever (12. 13) and pulling the string (23, 26). When metallic strip (22) upon being pulled up through string (23, 26) moves upwards/downwards, it vacates the concave housing (20) making space (21) in the concave housing (20) to receive the latch (19) and lock the door (3) manually.

In one preferred embodiment the manual control button/lever is spring loaded and may be lateral, horizontal or circular in shape and in the form of a lever or push button.

Figure 5:
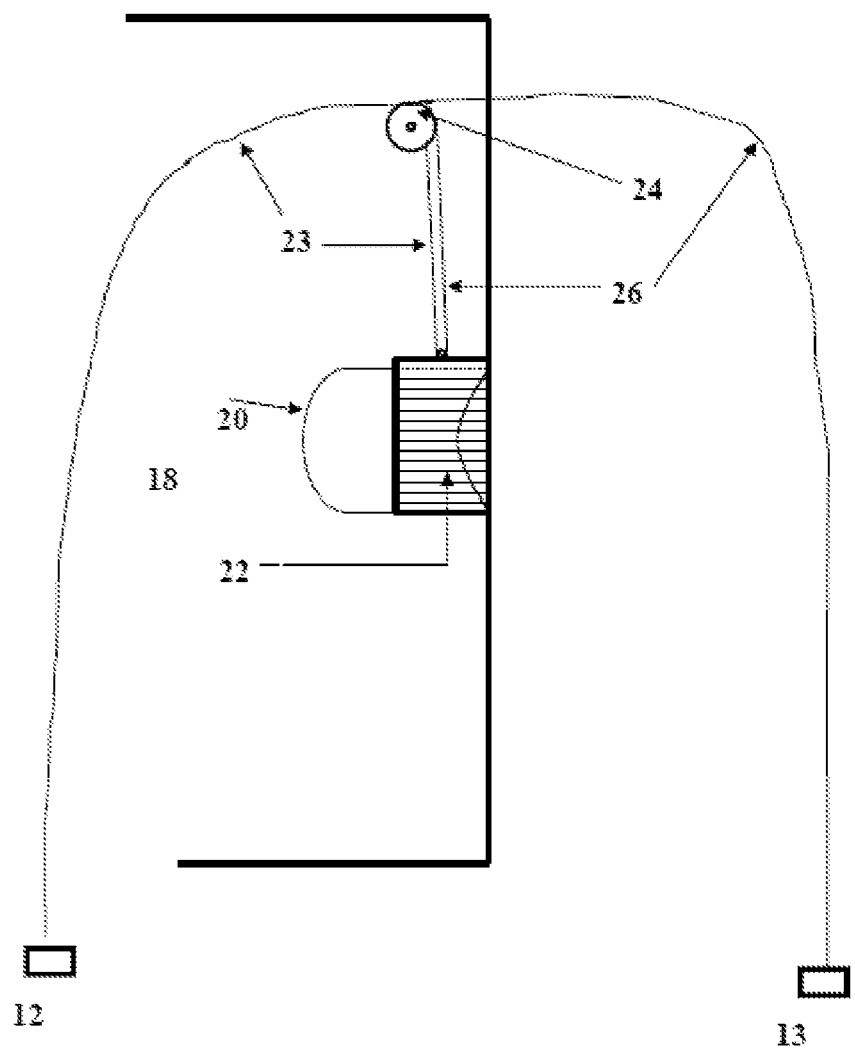
FIG. 5 illustrate the string connecting the manual control button/lever with metallic strip.

As shown in FIG. 5 the string (23 and 26) connects the manual control button/lever (12 and 13) with the metallic strip (22 or 14). The metallic strip (22 or 14) can be moved upwards or downwards by pressing at least one manual control button/lever (12 and 13) and pulling the string (23 or 26). When control button/lever (12, 13) is pressed or activated, it pulls the string (23 or 26) and enables the metallic strip (22 or 14) to move upwards/downwards from the concave housing (20) and thereby emptying the concave housing (20) to receive the latch (19) and lock the cockpit door (3). When metallic strip (22) upon being pulled up through string (23 or 26) moves upwards, it vacates the concave housing (20) making space (21) in the concave housing (20) to receive the latch (19) and lock the door (3) manually.

Figure 6:
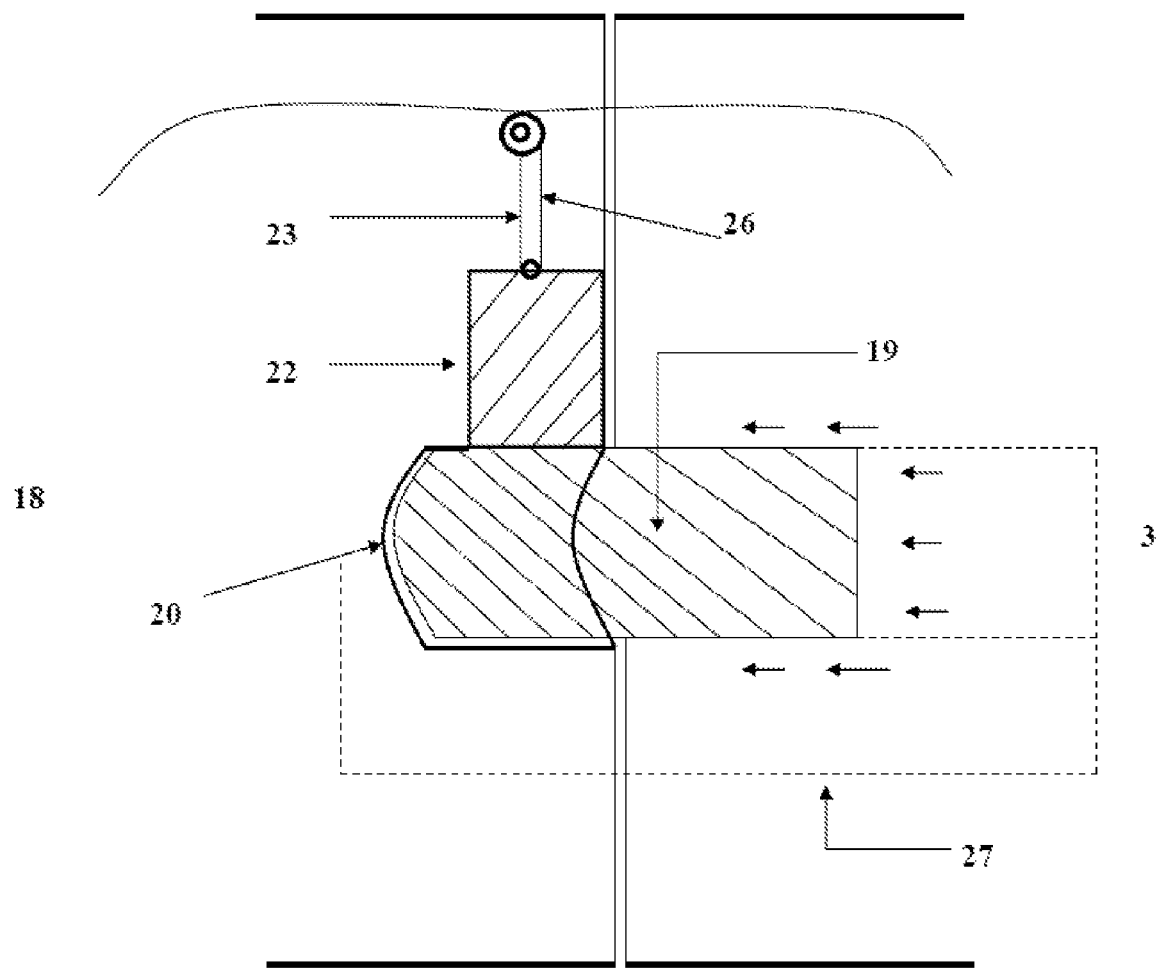
FIG. 6 illustrates the cockpit door in manually locked position.
Figure 7:
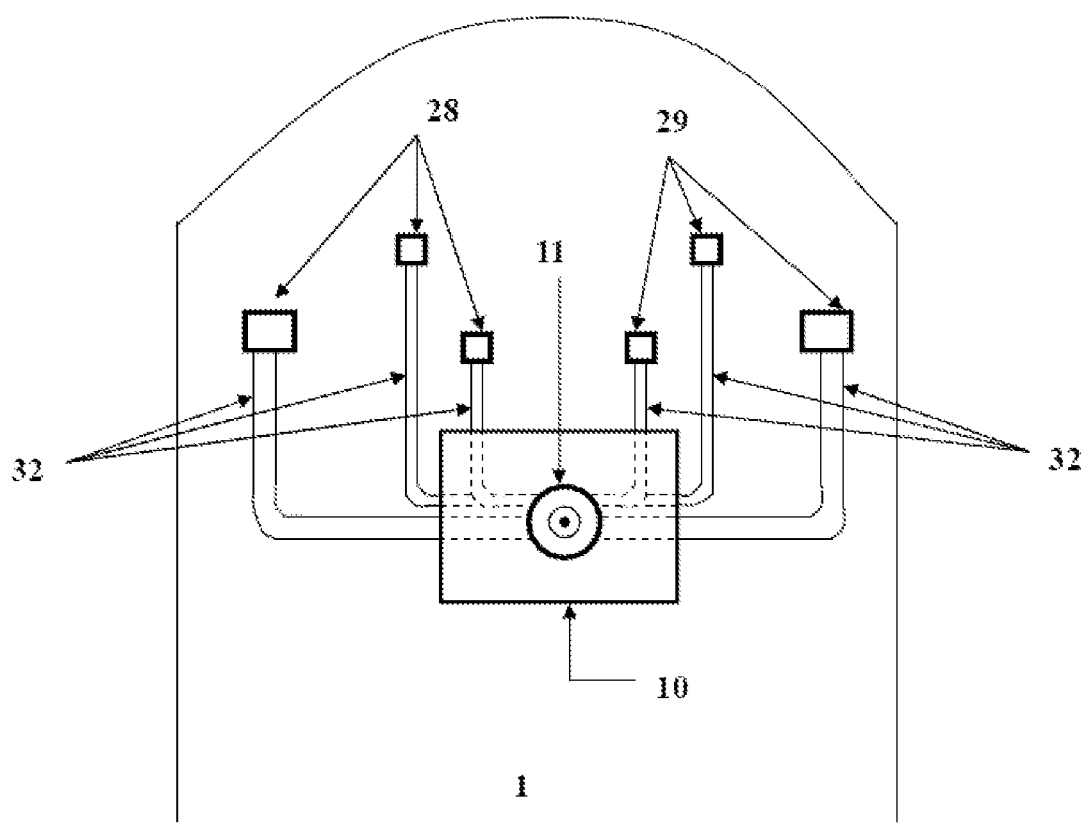
FIG. 7 illustrates control buttons/switches mechanically being connected to locking device on rotary/toggle switch in automated door lock system.
Figure 8:
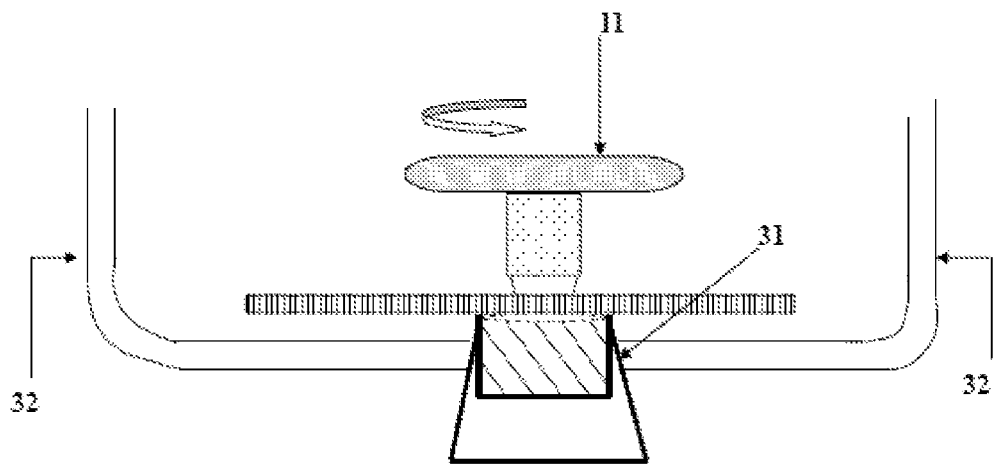
FIG. 8 represents a close view of locking device on rotary/toggle switch in locked position
Figure 9:
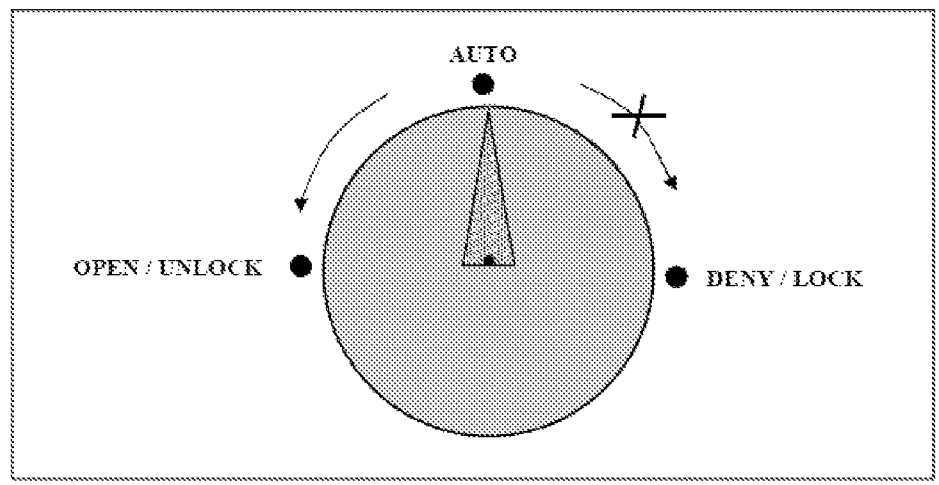
FIG. 9 illustrates three rotational positions of rotary switch.
Figure 9A:
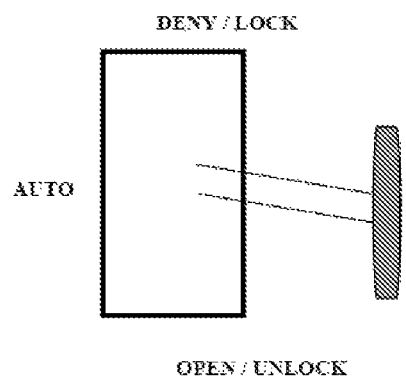
FIG. 9A represents toggles switch with three command positions.
Figure 10:
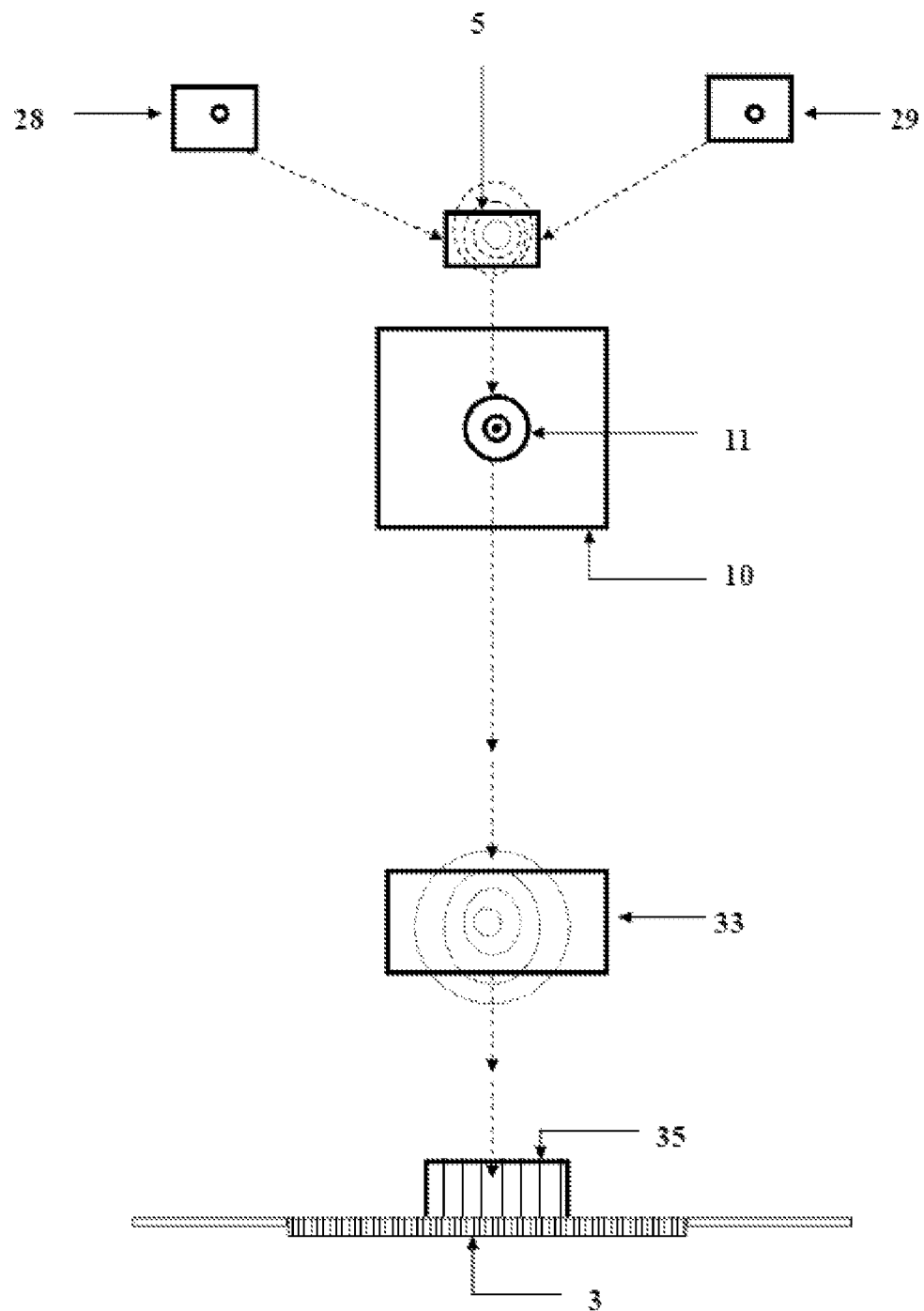
FIG. 10 is schematic representation of automated command system of the invention.

Alternatively, in an optional embodiment, when manual control button/lever (12, 13) is pressed or activated it pulls the string (23 or 26) which further pulls the spring (40) loaded metallic strip (14) towards downwards and enables the metallic strip (14) to move downwards from the concave housing (20) and thereby emptying the concave housing (20)

to receive the latch (19) and lock the cockpit door (3). As soon as the manual control button/lever (12, 13) is deactivated or released, the spring (40) pushes the metallic strip (14) back into the concave housing (20) and blocks the space (21). FIG. 6 illustrates the cockpit door (3) in manually locked position (27) in one embodiment.

According to this embodiment, for keeping the metallic strip (22, 14) in upward/downward position and manually locking the cockpit door (3) through latch (19), the control button/lever (12 or 13) should be constantly pressed/activated till the latch (19) is inserted into the concave housing (20) and cockpit door (3) is locked. According to the embodiment, action of activating/pressing the control button/lever (12 or 13) and action of manually inserting the latch (19) into concave housing (20), both should be done together and simultaneously. If the control button/lever (12 or 13) was released/de-activated before inserting the latch (19) into concave housing (20), the metallic strip (22, 14) will drop down/move up back into the concave housing (20) to its default position and will block the space (21) of concave housing (20) and therefore, it will become impossible to insert the latch (19) inside the concave housing (20) and manually lock the cockpit door (3).

In another embodiment, biometric/human touch sensor buttons are used as control buttons (12, 13) and radio frequency transponder is used in place of the string. The biometric or sensor buttons are connected to the locking device (17), more particularly to the metallic strip (22, 14) through radio frequency transponder which enables it to operate through radio frequency/electronic messages. The metallic strip (22, 14) which is replaced by a remote lock, through the sensor device attached to it, receives the activation message from control buttons (12, 13) and moves upwards/downwards from concave housing (20) making space for inserting the latch (19) and manual locking of cockpit door (3).

In another embodiment, a normal lock is used in place of metallic strip. The lock is placed within a casing along the door frame (18) and is connected to the control buttons (12, 13) through radio frequency transponder. In its default position, the lock is in locked position and therefore keeps the space (21) of concave housing (21) permanently blocked and does not allow the latch (19) to enter the concave housing (20) and locking the cockpit door (3). The control buttons (12, 13) upon being activated through appropriate stimulus send message through radio frequency transponder to unlock the lock and unblock the space (21) occupied in concave housing (20). This allows the latch (19) to enter into concave housing (20) and manually lock the cockpit door (3).

In a general embodiment, the control buttons should be bright, fluorescent and distinctively marked for all light conditions.

In manual locking of cockpit door (3), consistent activation of at least one control button/lever (12 or 13) and simultaneous insertion of the latch (19) on cockpit door (3) into the concave housing (20) in cockpit door frame (18) without de-activating the control button (12 or 13) until the latch (19) is completely inserted into the concave housing (20) is necessary.

In another embodiment, the system comprises a non-mechanical/electronic system which operates through radio frequency transponder (5, 33) and aircraft's electronic communication system (35). Under this embodiment, as represented in FIGS. 7, 8, 9, 9A and 10, the system comprises a pair of control buttons/switches (28, 29), a rotary/toggle switch (11) with a locking device (31) attached to it, radio frequency transponder (5, 33) and the cockpit door electronic locking device (35) both embedded in aircraft body and not visible from outside. The transponder (5, 33) may be placed at any suitable location inside the cockpit such as without being limited to, below coat hanger as being one option. Each control button/switch (28, 29) may be located at any suitable location inside the cockpit (1) such as near side window (6, 7) on each side of the cockpit or on/near central pedestal (10) or on/near front pedestals (15,16) of the cockpit. Preferably it may be on or near central pedestal.

In general, the control buttons/switches (28, 29) may be spring loaded, biometric or human touch sensor buttons which require constant pressure/activation or human touch during its operation in the system. The control buttons/switches (28, 29) are connected to the locking device (31) on rotary/toggle switch (11) through wired, mechanical or wireless means. The rotary/toggle switch (11) is the switch which is conventionally located on central pedestal (10) of the aircraft and operates between three positions of OPEN/ALLOW; AUTO; and DENY/CLOSE. Depending on the aircraft type it may be rotary switch or toggle switch. The rotary/toggle switch is used by the cockpit crew for allowing/denying entry into cockpit from aircraft's passenger cabin by electronically allowing or denying the unlocking/opening of cockpit door.

In the present invention, the rotary/toggle switch (11) towards its bottom side comprises one locking device (31). Only the rotary/toggle switch (11) is visible in the cockpit and the locking device (31) is concealed inside the central pedestal (10) and not visible from outside. The locking device (31) may have any suitable means for locking the one side movement of rotary/toggle switch (11) such as teeth, ball and socket, clamp or any other suitable locking structure.

In its default position, the locking device (31) on rotary/toggle switch (11) is in locked position and does not allow the rotation/movement of rotary/toggle switch (11) toward DENY/CLOSE position. However, in it default locked position, the locking device (31) only blocks the movement/rotation of rotary/toggle switch (11) from auto to deny/close position but it does not affect the free movement/rotation of rotary/toggle switch (11) from auto to open/unlock position.

Both control buttons (28, 29) are connected to locking device (31) of rotary/toggle switch (11) either through wired, mechanical or wireless means such as radio frequency transponder (5).

In one embodiment, the control buttons (28, 29) are connected to locking device (31) of rotary/toggle switch (11) through mechanical means (32) connecting control buttons (28, 29) to locking device (31) on rotary/toggle switch (11).

When activated simultaneously through both control buttons (28 and 29), the locking device (31) on rotary/toggle switch (11) is unlocked by releasing and moving the locking teeth away from each other and unlocking the rotary/toggle switch (11). The locking device (31) on rotary/toggle switch (11) can be unlocked only when both control buttons (28 and 29) are pressed/activated together and simultaneously. To keep the rotary/toggle switch (11) in unlocked position, constant activation/pressing of both control buttons (28 and 29) is necessary. Therefore, rotary/toggle switch (11) will be unlocked and available for auto to deny/close rotation/movement only for the period when both the control buttons (28 and 29) are activated/pressed simultaneously. To keep the rotary/toggle switch (11) in unlocked position and being able to move/rotate towards deny/close position simultaneous and consistent activation of both control buttons/switches (28 and 29) is mandatory. Activation/pressing only one control button (28 or 29) does not unlock the locking device (31) on rotary/toggle switch (11) and the rotary/toggle switch (11) remains in locked position being able to rotation/movement only from auto to open/allow position but not being able to move/rotate to close/deny position.

As soon as any or both the control buttons (28, 29) are released/deactivated, the locking device (31) on rotary/toggle switch (11) returns to its default locked position and blocks the rotation/movement of rotary/toggles switch to close/deny position.

In one embodiment, the wireless means connecting the control buttons (28, 29) to locking device (31) on rotary/toggle switch (11) comprise spring loaded, biometric or human touch sensor buttons connected to locking device (31) on rotary/toggle switch (11) through radio frequency transponder (5). Under this embodiment, both control buttons (28, 29) upon being simultaneously activated, send message to locking device (31) of rotary/toggle switch (11) through radio frequency transponder (5) and unlock the locking device (31). This allows free movement of rotary/toggle switch from auto to deny/close position.

In a general embodiment, simultaneous activation/pressing of both control buttons (28, 29) and rotation/movement of rotary/toggle switch (11) to deny/close position is required to deny the unlocking/opening of cockpit door (3). Upon receipt of consistent and simultaneous command from both the control buttons (28, 29), received either by wired, mechanical or wireless means, locking device (31) of rotary/toggle switch (11) is unlocked. This allows the rotary/toggle switch (11) to be rotated/moved to deny/close position and enabling the aircraft's electronic door system to keep the cockpit door in electronically locked position and disallowing anyone's entry into the cockpit.

In an exemplary embodiment of the invention, the system comprises denying the cockpit door (3) unlocking/opening by simultaneously and consistently activating/sending commands from both the control buttons (28, 29) to the locking device (31) on rotary/toggle switch (11) either by wired, mechanical or wireless means, unlocking the rotary/toggle switch (11), rotating/moving the rotary/toggle switch (11) to deny/close position, sending wireless/radio message to the electronic locking device (35) on cockpit door through aircraft's conventional electronic system and transponder (33) and denying the cockpit door (3) opening.

As it is apparent hereinabove paragraphs, in any of the above embodiment, the system requires at least three hands to operate the system therefore, at any time at least two person are mandatory to be present in the cockpit to give the deny/close command electronically or to close the cockpit door manually. A person alone in the cockpit will never be able to give the deny/close command electronically or to close the cockpit door manually.

Therefore, under various embodiments described in above paragraphs, the invention provides a very efficient, foolproof, technically viable and cost effective cockpit internal anti-sabotage system (CIASS) to prevent the attempt to commit suicide or sabotage the aircraft by a single cockpit crew. This novel system is provided without compromising the cockpit security and the present anti-hijacking procedures and protocols. Therefore, on one hand the invention provides a system wherein a single cockpit crew alone in the cockpit cannot deny bonafide entry of other cockpit crew or cabin crew in an attempt to commit suicide or sabotage the aircraft and on the other hand it does not compromise the cockpit security and the present anti-hijacking procedures and protocols.

Without being limited to, it would also be possible for a person skilled in the art to club both manual and automated door lock systems in such a way that both system can be operated using the same control buttons. Under such embodiment, pressing/activating same control button will activate the manual locking device on cockpit door/door frame at one hand and will unlock the locking device on rotary/toggle switch on the other hand.

In a further embodiment, the invention provides a system to prevent the aircraft hijack by unauthorized or forceful entry into the cockpit by deactivating the electronic pad outside cockpit door for an altitude of 0-2500 feet from the ground level. According to this embodiment, the electronic pad outside the cockpit door is deactivated at the time of takeoff the aircraft upto the aircraft reaching at an altitude of 2500 feet and upon reaching to this height from land surface the electronic pad is reactivated. For automatic activation and deactivation of the electronic pad, the pad is connected with aircraft's height altimeter or radio altimeter and through an electronic circuit which works under automatic electronic system without any human intervention. Such circuit can easily be developed by a person skilled in the art. Alternately the air ground sensor switch circuit can also be used for this temporary de-activation of the electronic keypad.

Similarly, the electronic pad outside the cockpit door is deactivated at the time of landing the aircraft upon descending the aircraft height at an altitude of 2500 feet from the land surface and is reactivated upon touching the ground using the same electronic circuit.

I claim:

1. A Cockpit Internal Anti Sabotage System (CIASS), the system comprising:
   a door lock system for a door of the cockpit, the door lock system having an auto position, an open or allow position and a deny or close position wherein the auto position enables emergency access to the cockpit by entry of a code in an electronic pad positioned outside the cockpit, keeping the cockpit accessible to able bodied passengers, cabin crew and sky marshals in case of emergencies by means of external keypad, and the deny or close position prevents opening of the door from outside the cockpit;
   wherein the Cockpit Internal Anti Sabotage System further includes a pair of control buttons or levers operatively coupled to the door lock system;
   wherein the door lock system and the pair of control buttons or levers are operatively coupled such that movement of the door lock system to the deny or close position is prevented unless any one or both control buttons or levers of the pair of control buttons or levers are actuated and held in the actuated position;
   wherein each of the pair of control buttons or levers is located in the cockpit remote from the actuation means of the door lock system and spaced apart from each other so that a single person using two hands is unable to actuate the door lock system to the deny or close position; and
   wherein inability of a single person to actuate the pair of control buttons or levers and hold them in actuated position while moving the actuation means of the door lock system to the deny or close position prevents internal sabotage of an aircraft by a cockpit crew by locking himself in the cockpit and denying bonafide entry of other cockpit crew or cabin crew into the cockpit.

2. The system as claimed in claim 1, wherein the door lock system comprises a manual locking device placed on the cockpit door and door frame from inside the cockpit, the locking device having a latch placed on the cockpit door and a corresponding housing on door frame with a cavity to receive the latch, wherein movement of the latch to engage with the cavity in the housing corresponds to deny/close position of the lock system.

3. The system as claimed in claim 2, wherein the manual door lock system further comprises a metallic strip configured to move between a first position in which the metallic strip blocks movement of the latch to engage with the cavity in the housing, and a second position in which the metallic strip allows the latch to move and engage with the cavity, and wherein the first position is default position of the metallic strip and simultaneous actuation of each of the pair of control buttons or levers moves the metallic strip to the second position.

4. The system as claimed in claim 3, wherein each of the pair of control buttons or levers is a manual control button or lever that are operatively coupled to the door lock system by means of a strong string.

5. The system as claimed in claim 4, wherein the string is a light weight string made of metal, alloys, cotton, silk or any other suitable material having high tensile strength, and is housed within a steel tubing encompassed in the aircraft's body frame.

6. The system as claimed in claim 4, wherein the string is routed between control buttons or levers through a frictionless pulley, and wherein the pulley is connected to the metallic strip such that movement of the pulley causes the metallic strip to move from its default position to the second position.

7. The system as claimed in claim 6, wherein actuation of the control buttons or levers results in movement of the metallic strip from its default position towards the second position, and further wherein actuation of any one or both the control buttons or levers is required to move the metallic strip fully to the second position to allow the latch to move and engage with the cavity to move the lock system to the deny or close position.

8. The system as claimed in claim 7, wherein control buttons or levers are biased to move back to original position when released from their respective actuation positions thereby moving the metallic strip back to its default position, requiring any one or both of the control buttons or levers to be held in actuation position to keep the metallic strip in the second position and move the lock system to the deny or close position.

9. The system as claimed in claim 2, wherein each of the pair of control buttons is a biometric or sensor control button that are operatively coupled to the door lock system through radio frequency transponders.

10. The system as claimed in claim 9, wherein the lock system further comprises a radio frequency transponder operated lock, the lock configured to block movement of the latch to engage with the cavity in its default position, and to allow movement of the latch to engage with the cavity when activated by the radio frequency transponders, wherein actuation of both the biometric or sensor control buttons is required to unblock movement of the latch to the second position.

11. The system as claimed in claim 1, wherein the door locking system comprises a non-mechanical or electronic locking device with rotary or toggle switch as the actuating means, having the auto position, the open or allow position and the deny or close position, wherein the locking device incorporates means to lock rotation of the rotary or toggle switch to prevent movement of the rotary or toggle switch so as to prevent moving the locking device to the deny or close position.

12. The system as claimed in claim 11, wherein the locking means in its default position block movement of the rotary or toggle switch from auto to deny or close position without affecting movement of rotary or toggle switch from an auto position to open or allow position.

13. The system as claimed in claim 12, wherein the locking means lock the rotary or toggle switch from two opposite sides, the locking means on each of the two opposite sides being operatively coupled to a control button or lever out of the pair of control buttons or levers thus requiring simultaneous actuation of each of the pair of control buttons or levers to move the rotary or toggle switch to the deny or close position.

14. The system as claimed in claim 12, wherein the pair of control buttons or levers is operatively coupled with the locking means through two light weight mechanical connections having high tensile strength and made of any one or a combination of metal, alloys, cotton, silk, and connecting each of the control buttons or levers to respective locking device means on rotary or toggle switch on opposite directions.

15. The system as claimed in claim 13, wherein each of the control buttons or levers of the pair of control buttons or levers is operatively coupled with the respective locking means through radio frequency transponders.

16. The system as claimed in claim 15, wherein both of the pair of control buttons or levers upon being simultaneously activated send message through transponder to the respective locking means of the rotary or toggle switch thereby unlocking the rotary or toggle switch and allowing free movement of the rotary or toggle switch from the auto position to the deny or close position.

17. The system as claimed in claim 16, wherein constant and simultaneous activation of both control buttons is required for keeping the rotary or toggle switch in unlocked position and enabling the crew to rotate or move the rotary or toggle switch to deny or close position and keeping the cockpit door in electronically locked position.

18. The system as claimed in claim 1, wherein the door locking system comprises a non-mechanical or electronic locking device with rotary or toggle switch as the actuating means, the rotary or toggle switch having the auto position, the open or allow position and the deny or close position,
wherein each of the control buttons or levers of the pair of control buttons or levers is operatively coupled with the respective locking means through circuit interrupters to provide electronic/electrical intervention to disable function provided by the deny or close position of the rotary or toggle switch.

19. The system as claimed in claim 1, wherein actuating means for the door lock system on the cockpit door and the pair of control buttons or levers are placed apart from each other at least at a distance which cannot be reached by both hands of a single person, and wherein two control buttons or levers of the pair of control buttons or levers are placed apart from each other at least at a distance which cannot be reached by single hand of a single person.

20. A Cockpit Internal Anti Sabotage System (CIASS) for an aircraft, the system comprising:
a door lock system for a door of the cockpit, the door lock system having an auto position, an open or allow position and a deny or close position wherein the auto position enables emergency access to the cockpit by entry of a code in an electronic pad positioned outside the cockpit, keeping the cockpit accessible to able bodied passengers, cabin crew and sky marshals in case of emergencies by means of external keypad, and the deny or close position prevents opening of the door from outside the cockpit; and a pair of control buttons or levers operatively coupled to the door lock system, wherein the door lock system and the pair of control buttons or levers are operatively coupled such that movement of the door lock system to the deny or close position is prevented unless any one or both control buttons or levers of the pair of control buttons or levers are actuated, and held in the actuated position;

wherein each of the pair of control buttons or levers is located remote from actuation means of the door lock system and spaced apart from each other such that a single person using two hands is unable to actuate the door lock system to the deny or close position; and wherein the system is integrated with automated system of the aircraft including aircraft's height altimeter or radio altimeter, and wherein the system deactivates the electronic pad at the time of takeoff and at the time of landing for an altitude of 0-2500 feet from the ground level, and reactivates the electronic pad upon crossing altitude of 2500 feet and on touching the ground respectively.

* * * * *